United States Patent
Blasig et al.

(10) Patent No.: US 7,352,131 B2
(45) Date of Patent: Apr. 1, 2008

(54) ELECTRIC LAMP COMPRISING A LEAD-FREE GLASS COMPONENT

(75) Inventors: Roland Blasig, Aachen (DE); Simon Krijnen, Eindhoven (DE)

(73) Assignee: Koninklijke Philips Electronics N.V., Eindhoven (NL)

(*) Notice: Subject to any disclaimer, the term of this patent is extended or adjusted under 35 U.S.C. 154(b) by 174 days.

(21) Appl. No.: 10/520,192

(22) PCT Filed: Jun. 18, 2003

(86) PCT No.: PCT/IB03/02749

§ 371 (c)(1),
(2), (4) Date: Jan. 4, 2005

(87) PCT Pub. No.: WO2004/005208

PCT Pub. Date: Jan. 15, 2004

(65) Prior Publication Data

US 2006/0164015 A1    Jul. 27, 2006

(30) Foreign Application Priority Data

Jul. 8, 2002 (EP) ............................ 02077721

(51) Int. Cl.
*H01J 17/16* (2006.01)
*C03C 3/085* (2006.01)

(52) U.S. Cl. .................. 313/636; 313/493; 501/64; 501/62

(58) Field of Classification Search .......... 313/634, 313/493; 501/64, 62, 60
See application file for complete search history.

(56) References Cited

U.S. PATENT DOCUMENTS

| | | | | |
|---|---|---|---|---|
| 4,390,637 A | * | 6/1983 | Daiku | 501/64 |
| 4,666,871 A | | 5/1987 | Spierings et al. | |
| 5,470,805 A | | 11/1995 | Filmer | |
| 5,625,582 A | * | 4/1997 | Timko | 708/708 |
| 5,925,582 A | | 7/1999 | Filmer et al. | |
| 2002/0001881 A1 | * | 1/2002 | Kosokabe | 438/127 |

FOREIGN PATENT DOCUMENTS

| | | |
|---|---|---|
| DE | 2519505 | 11/1975 |
| JP | 2252636 | 10/1990 |
| JP | 11176379 | 7/1999 |
| WO | 0650936 | 4/1998 |
| WO | 0936195 | 6/2002 |

* cited by examiner

*Primary Examiner*—Joseph L. Williams

(57) ABSTRACT

The electric lamp has a glass component with a composition which, according to the invention, is substantially free of PbO and has the following constituents: 55–70 wt. % $SiO_2$, <0.1 weight % $Al_2O_3$, 0.5–4 weight % $Li_2O$, 0.5–3 weight % $Na_2O$, 10–15 wt. % $K_2O$, 0–3 wt. % MgO, 0–4 wt. % CaO, 0.5–5 wt. % SrO, 7–10 wt. % BaO. Preferably, the composition of the glass comprises: 65–70 wt. % $SiO_2$, 1.4–2.2 wt. % $Li_2O$, 1.5–2.5 wt. % $Na_2O$, 11–12.3 wt. % $K_2O$, 1.8–2.6 wt. % MgO, 2.5–5 wt. % CaO, 2–3.5 wt. % SrO, 8–9.5 wt. % BaO. The glass is preferably used as a CFL-envelope glass or as glass for a stem. The electric lamp made with a glass according to the invention has favorable fusion and processing properties, in particular a liquidus temperature $T_{liq} \leq 800°$ C.

17 Claims, 3 Drawing Sheets

ELECTRIC LAMP COMPRISING A LEAD-FREE GLASS COMPONENT

The invention relates to an electric lamp comprising a glass component having a composition.

The invention also relates to a stem for an electric lamp having a glass portion, the glass portion manufactured from a glass having such a composition.

The invention also relates to a lamp envelope manufactured from a glass having such a composition.

In addition, the invention relates to a mercury vapor discharge lamp comprising a lamp envelope, the lamp envelope enclosing, in a gastight manner, a discharge space provided with a filling of mercury and a rare gas, the lamp envelope comprising discharge means for maintaining a discharge in the discharge space.

In mercury vapor discharge lamps, mercury constitutes the primary component for the (efficient) generation of ultraviolet (UV) light. A luminescent layer comprising a luminescent material (for example, a fluorescent powder) may be present on an inner wall of the lamp envelope, also known as the discharge vessel, to convert UV to other wavelengths, for example, to UV-B and UV-A for tanning purposes (sun panel lamps) or to visible radiation for general illumination purposes. Such discharge lamps are therefore also referred to as fluorescent lamps. Alternatively, the ultraviolet light generated may be used for manufacturing germicidal lamps (UV-C). The lamp envelope of a low-pressure mercury vapor discharge lamp is usually tubular and circular in section and comprises both elongate and compact embodiments. Generally, the tubular lamp envelope of a so-called compact fluorescent lamp comprises a collection of relatively short straight parts having a relatively small diameter, which straight parts are connected together by means of bridge parts or arc-shaped parts. Compact fluorescent lamps are usually provided with an (integrated) lamp cap.

The lamp envelope of a mercury vapor discharge lamp, e.g. a fluorescent lamp, is generally made of a cheap, so-called soda-lime type of glass. Compact fluorescent lamps are usually made of lead-free Ba—Sr-rich glass. Apart from straight or bent parts, the lamp envelope may also comprise (two) so-called glass stems or end portions where the lamp envelope is hermetically sealed, said end portions enabling passage of the current-supply conductors.

In U.S. Pat. No. 5,925,582 a description is given of a glass having a low sodium content for use in fluorescent lamps. The known glass contains less than 0.1% by weight of $Na_2O$. However, the liquidus temperature ($T_{liq}$) is still relatively high, which renders the processing of electric lamps with a lamp envelope made from this known glass relatively difficult.

It is an object of the invention to eliminate the above disadvantage wholly or partly. It should be possible to melt the glass in existing furnaces and the glass should be readily processable to form, inter alia, glass tubing and, subsequently, lamp envelopes. The glass should also be free of PbO and other volatile, toxic, or corrosive components such as $Sb_2O_3$, $As_2O_3$ and F. Like the known glass, the glass in accordance with the invention is preferably free of $B_2O_3$ and $ZrO_2$. $B_2O_3$ is disadvantageous because it is expensive and aggressive relative to the refractory material of the glass furnace. $ZrO_2$ adversely affects the melting behavior of the glass. Another object of the invention is to provide a cheaper glass.

The invention also aims at providing a mercury vapor discharge lamp comprising a lamp envelope, in particular a stem or a tubular lamp envelope, which is made of such a glass composition, the lamp having favorable processing properties. The other physical properties should match those of the customarily used sodium-containing glasses.

According to the invention, the electric lamp comprises a glass component, wherein the composition of the glass component is substantially free of PbO and comprises, expressed as a percentage by weight (denoted by weight % or wt. %), the following constituents:

55–70 weight % $SiO_2$,
<0.1 weight % $Al_2O_3$,
0.5–4 weight % $Li_2O$,
0.5–3 weight % $Na_2O$,
10–15 weight. % $K_2O$,
0–3 weight % MgO,
0–4 weight % CaO,
0.5–5 weight % SrO,
7–10 weight % BaO.

Said glass has a liquidus temperature ($T_{liq}$) which is at least 100° C. lower than the known glass. Such a glass has favorable fusion and processing properties. The glass composition is very suitable for drawing glass tubing and for use as a lamp envelope in a fluorescent lamp, in particular a tubular lamp envelope for a compact fluorescent lamp (CFL), in which the wall load is higher than in a "TL" lamp (normal straight tubular fluorescent lamp) owing to the smaller diameter of the lamp envelope. The glass may also suitably be used to manufacture bulb-shaped lamp envelopes for fluorescent lamps, such as the so-called electrodeless or "QL" mercury vapor discharge lamps. The glass may also suitably be used to manufacture other parts of the lamp envelope, such as stems.

This glass composition does not comprise the above-mentioned detrimental components PbO, F, $As_2O_3$, and $Sb_2O_3$.

The $SiO_2$ content of the glass in accordance with the invention is limited to 55–70 wt. %. In combination with the other constituents, said $SiO_2$ content leads to a readily fusible glass. As is known in the art, $SiO_2$ serves as a network former. If the $SiO_2$ content is below 55 wt. %, the cohesion of the glass and the chemical resistance are reduced. An $SiO_2$ content above 70 wt. % hampers the vitrification process, causes the viscosity to become too high, and increases the risk of surface crystallization.

The substantial absence of $Al_2O_3$ has the following advantages. The liquidus temperature ($T_{liq}$) is reduced by at least 100° C. due to favorable crystallization properties. The absence of $Al_2O_3$ in the glass composition according to the invention, as compared with that of the known glass composition, does not have a detrimental influence on the chemical resistance nor on the resistance to weathering of the glass. In addition, the glass according to the invention exhibits a low crystallization tendency as well as a viscosity and softening temperature ($T_{soft}$) enabling a good processing of the glass.

The alkali metal oxides $Li_2O$, $Na_2O$, and $K_2O$ are used as melting agents and lead to a reduction of the the viscosity of the glass. If both alkali metal oxides are used in the above composition, then the so-called mixed-alkali effect causes the electrical resistance to be increased and $T_{liq}$ to be reduced. In addition, the alkali metal oxides predominantly determine the expansion coefficient a of the glass. This is important because it must be possible to seal the glass to the stem glass and/or the current supply conductors, for example, of copper-plated iron/nickel wire in such a way that the glass is free from stress. If the alkali-metal-oxide content is below the indicated limits, the glass will have a too low α-value (coefficient of linear expansion), and $T_{soft}$ (softening point) will be too high. Above the indicated limits, the α-value will be too high. $Li_2O$ causes a greater reduction of $T_{soft}$ than $K_2O$, which is desirable for obtaining a wide so-called "Working Range" ($=T_{work}-T_{soft}$). Too high an $Li_2O$ content leads to an excessive increase of $T_{liq}$. In addition, $Li_2O$ is an expensive component, so that, also from an economical point of view, the $Li_2O$ content is limited.

BaO has the favorable property that it causes the electrical resistance of the glass to increase and $T_{soft}$ to decrease. Below 7 wt. %, the melting temperature ($T_{melt}$), $T_{soft}$, and the working temperature ($T_{work}$) increase too much. Above 10 wt. %, the liquidus temperature ($T_{liq}$) and hence the crystallization tendency increase too much.

The alkaline earth metal oxides SrO, MgO, and CaO have the favorable property that they lead to a reduction of $T_{melt}$.

Preferably, the composition of the glass comprises: 65–70 wt. % $SiO_2$, 1.4–2.2 wt. % $Li_2O$, 1.5–2.5 wt. % $Na_2O$, 11–12.3 wt. % $K_2O$, 1.8–2.6 wt. % MgO, 2.5–5 wt. % CaO, 2–3.5 wt. % SrO, 8–9.5 wt. % BaO. The glass in accordance with the invention has a favorable $T_{liq} \leq 800°$ C. and hence hardly tends towards crystallization during the manufacture of the glass and during the drawing of glass tubing from said glass. By keeping the concentrations in the preferred range and by virtue of a wide Working Range of at least 310° C. and a low $T_{soft}$ (700° C.), the glass can be shaped into a tube without any problems by means of, for example, the Danner or the Vello process known in the art. In addition, the cost price of the preferred glass composition is reduced.

Said glass has favorable fusion and processing properties. The linear expansion coefficient may be tuned to match the glass with other glasses. In addition, the other physical parameters may be chosen to approximately equal those of the known glass (see also Table II below). The glass composition according to the preferred embodiment of the invention is very suitable for drawing glass tubing and for use as a lamp envelope or stem in a fluorescent lamp.

Preferably, the sum of the concentrations of $Li_2O$, $Na_2O$, and $K_2O$ is in the range from 14 to 16 wt. %. Preferably, the sum of the concentrations of SrO and BaO is in the range from 10 to 12.5 wt. %. By keeping the concentrations in the preferred ranges, the coefficient of linear expansion of the preferred glass composition has favorable properties.

The glass composition in accordance with the invention can be refined by means of $Na_2SO_4$, so that the glass may contain up to 0.2 wt. % $SO_3$. The glass may additionally contain an impurity in the form of approximately 0.5 weight % $Fe_2O_3$, preferably less than 0.2 weight % $Fe_2O_3$, which originates from the raw materials used. If necessary, up to 0.5 wt. % $CeO_2$, preferably less than 0.2 wt. % $CeO_2$, is added to the glass to absorb undesirable UV radiation.

In order to attain a satisfactory lumen maintenance of the lamp and to keep mercury consumption low, it is known in the art to provide the inner surface of the lamp envelope with a protective coating, for example, of $Y_2O_3$. Drawbacks of such protective coatings, for instance loss in light transmission, can now be obviated. In the case of a glass composition in accordance with the invention, such a coating and hence an additional process step, are no longer necessary, leading to a cost reduction in lamp manufacture.

These and other aspects of the invention are apparent from and will be elucidated with reference to the embodiments described hereinafter.

Figure 3:
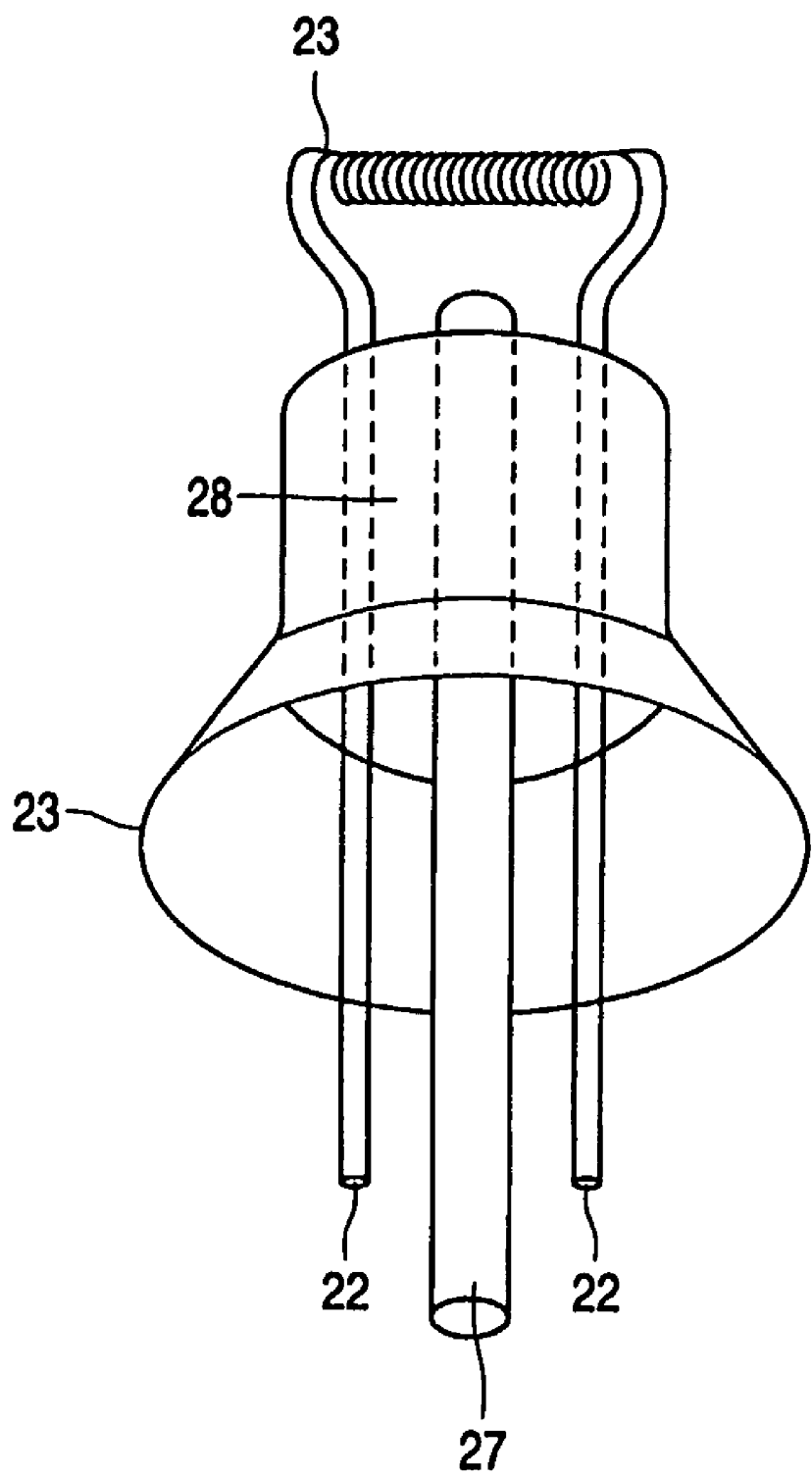
Figure 4:
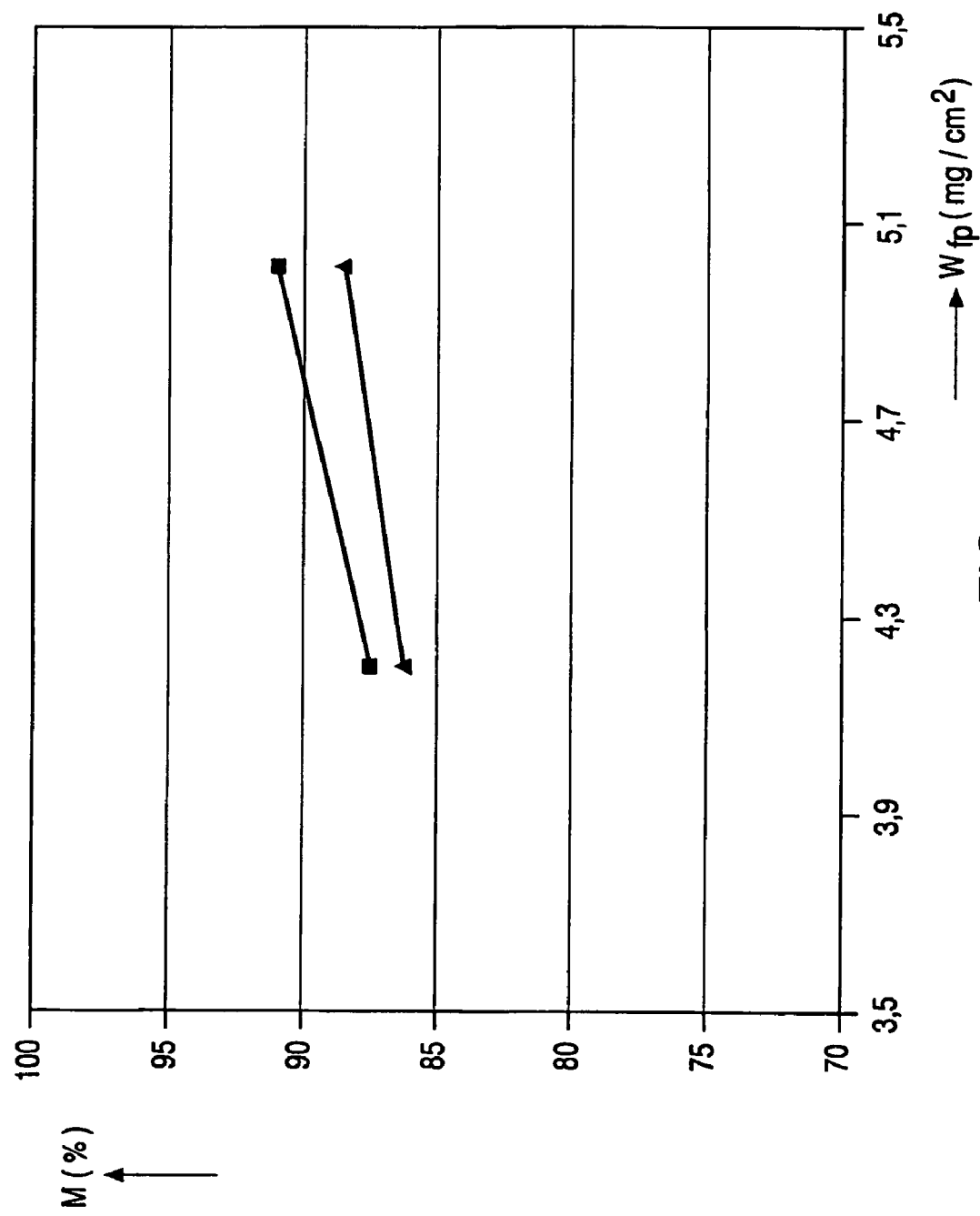

FIG. 3 is a perspective view of a stem for an electric lamp made from a glass with a composition in accordance with the invention, and FIG. 4 shows the lumen maintenance as a function of the fluorescent powder weight of a low-pressure mercury-vapor discharge lamp with a lamp envelope made from a glass with a composition in accordance with the invention as compared with a lamp envelope made from the known glass.

The Figures are purely diagrammatic and not drawn to scale. Notably, some dimensions are shown in a strongly exaggerated form for the sake of clarity. Similar components in the Figures are denoted as much as possible by the same reference numerals.

Figure 1:
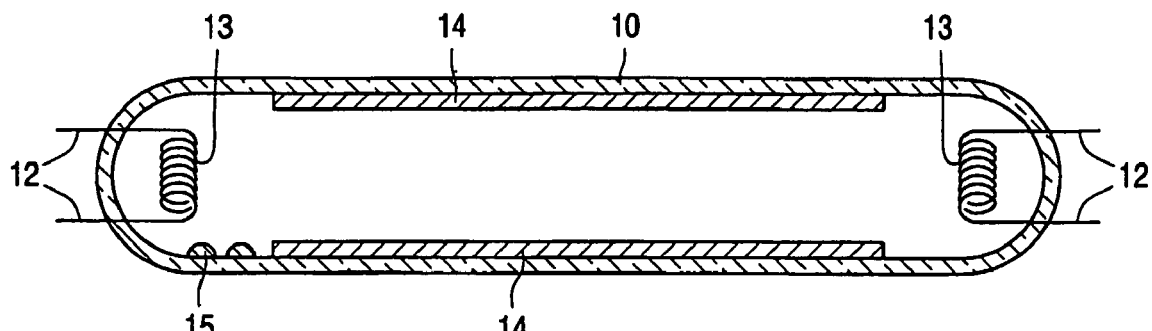
FIG. 1 is a cross-sectional view of a low-pressure mercury vapor discharge lamp with a lamp envelope made from a glass with a composition in accordance with the invention.

FIG. 1 shows very schematically a sectional view of a low-pressure mercury-vapor discharge lamp with a tubular lamp envelope 10 which is circular in cross-section and which is made of a glass having a composition in accordance with the invention. Current-supply conductors 12 which are connected to electrodes 13 are provided so as to pass through the walls of the lamp envelope 10. Each of the electrodes 13 in FIG. 1 comprises a winding of tungsten coated with an electron-emissive material, here a mixture of barium oxide, calcium oxide, and strontium oxide. A layer of a fluorescent material (phosphors) 14 is provided on the inner surface of the lamp envelope 10. Metallic mercury 15, which evaporates after ignition of the lamp, is present within the lamp envelope 10. Before such a lamp is sealed off, it is filled with argon having a pressure of approximately 700 Pa. In an alternative embodiment of the low-pressure mercury vapor discharge lamp, the lamp envelope is provided with an amalgam.

The light output of the lamp (in lumens) after 4000 burning hours has decreased by only 2% relative to the light output at the beginning of the operating period (reference point=100 hours). Lumen maintenance of the lamp is similar to that of a lamp made from a glass with the known composition provided with an internal protective $Y_2O_3$ coating.

Figure 2:
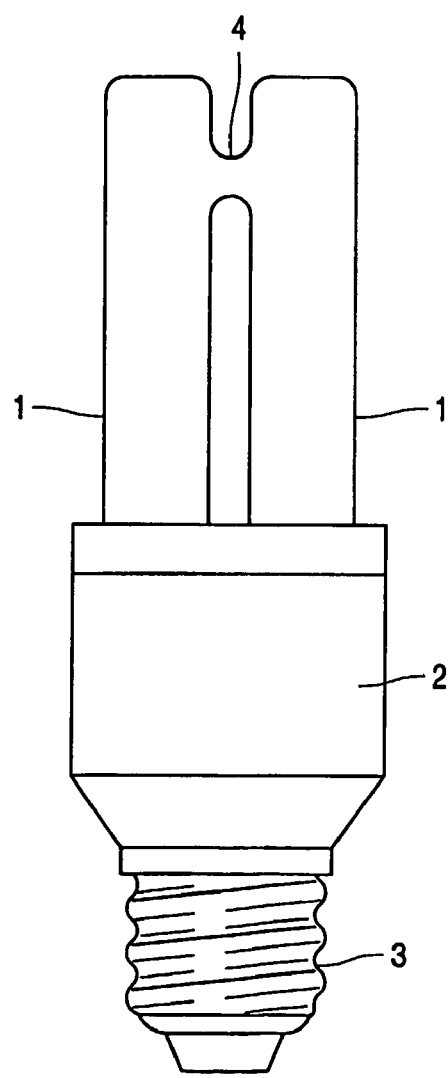
FIG. 2 is a side elevation of compact fluorescent lamp with a lamp envelope made from a glass with a composition in accordance with the invention.

FIG. 2 is a schematic side elevation of a compact fluorescent lamp. The lamp is composed of four thin parallel lamp envelopes 1 (only two of which are shown in the drawing) which are made of a glass having a composition in accordance with the invention. The lamp envelopes are connected to each other by a bridge 4. The lamp also comprises a lamp base 2 for accommodating electronic circuitry and a threaded lamp holding means 3 which is to be installed in a luminaire and through which the mains voltage is supplied. Due to the substantial wall load, the use of a glass according to the invention to the invention is particularly advantageous.

A glass of a composition according to a particularly favorable embodiment was prepared, comprising 68 wt. % $SiO_2$, 1.6 wt. % $Li_2O$, 1.9 wt. % $Na_2O$, 11 wt. % $K_2O$, 2.4 wt. % MgO, 4.5 wt. % CaO, 2.1 wt. % SrO, 8.3 wt. % BaO (see Table 1). The glass composition also comprises approximately 0.05 weight % $Fe_2O_3$, approximately 0.06 weight % $SO_3$, and approximately 0.05 wt % $CeO_2$. The sum of the concentrations of $Li_2O$, $Na_2O$, and $K_2O$ in this embodiment of the glass composition is approximately 14.5 wt. %, and the sum of the concentrations of SrO and BaO is approximately 10.4 wt. %, giving the glass a relatively low cost price. The melting operation is carried out in a platinum crucible in a gas-fired furnace at 1450° C. For the starting materials use is made of quartz sand, dolomite ($CaCO_3 \cdot MgCO_3$), and the carbonates of Li, Na, K, Sr, and Ba. The refining agent used is $Na_2SO_4$. During melting and further processing no particular problems occur. For comparison, Table I shows an example of a glass having a low sodium content in accordance with United States Patent Specification U.S. Pat. No. 4,925,582.

TABLE I

Glass composition according to a particularly favorable embodiment of the invention composition in wt. %

| constituents | glass in accordance with the invention | glass in accordance with U.S. Pat. No. 4,925,582 |
|---|---|---|
| $SiO_2$ | 68 | 62.8 |
| $Al_2O_3$ | <0.1 | 4.0 |
| $Li_2O$ | 1.6 | 2.8 |
| $Na_2O$ | 1.9 | 0.05 |
| $K_2O$ | 11 | 12.7 |
| MgO | 2.4 | 1.4 |
| CaO | 4.5 | 2.0 |
| SrO | 2.1 | 5.0 |
| BaO | 8.3 | 9.0 |
| $SO_3$ | 0.06 | 0.15 |
| $Fe_2O_3$ | 0.05 | 0.03 |
| $CeO_2$ | 0.05 | 0.1 |

Table II gives the physical properties of the glass composition according to the invention compared with the known glass composition.

TABLE II

Physical properties of the glass compositions according to Table I composition in wt. %

| properties | glass in accordance with the invention | glass in accordance with U.S. Pat. No. 5,925,582 |
|---|---|---|
| $\alpha_{25-300}$ | 9.2 | 9.2 |
| $T_{strain}$ (° C.) | 480 | 487 |
| $T_{ann}$ (° C.) | 515 | 518 |
| $T_{soft}$ (° C.) | 700 | 692 |
| $T_{work}$ (° C.) | 1015 | 1008 |
| $T_{melt}$ (° C.) | 1445 | 1446 |
| $T_{K100}$ (° C.) | 375 | 368 |
| $T_{rho}$ (° C.) | 480 | 471 |
| $\log(rho)_{250}$ | 10.6 | 10.4 |
| $\log(rho)_{350}$ | 8.4 | 8.3 |
| $T_{liq}$ (° C.) | 775 | 920 |
| s.m. (kg/dm³) | 2.62 | 2.62 |
| W.R. (° C.) | 315 | 316 |

The symbols in Table II have the following meanings:

$\alpha_{25-300}$ ... ($10^{-6}$/° C.): average coefficient of linear expansion between 25° C. and 300° C.

$T_{strain}$ (° C.): temperature at which $\eta$ (viscosity) = $10^{14.5}$ dPa · s, termed strain point.

$T_{ann}$ (° C.): temperature at which $\eta$ = $10^{13.0}$ dPa · s, termed annealing point.

$T_{soft}$ (° C.): temperature at which $\eta$ = $10^{7.6}$ dPa · s, termed softening point.

$T_{work}$ (° C.): temperature at which $\eta$ = $10^{4.0}$ dPa · s, termed working temperature.

$T_{melt}$ (° C.): temperature at which $\eta$ = $10^{2.0}$ dPa · s, termed melting point.

rho (ohm · cm): specific resistance.

$T_{K100}$ (° C.): temperature at which rho = $10^8$ ohm · cm.

$T_{rho}$ (° C.) temperature at which rho = $10^{6.52}$ ohm · cm.

$\log(rho)_{250}$: logarithm to the base 10 of rho at 250° C.

$\log(rho)_{350}$: logarithm to the base 10 of rho at 350° C.

$T_{liq}$ (° C.): temperature above which the glass no longer crystallizes.

s.m. (kg/dm³): specific mass.

W.R. (° C.): Working Range = $T_{work}$ − $T_{soft}$

The striking result of the comparison of glass compositions in Table II is that all physical properties are approximately the same for the glass composition in accordance with the invention and for the known glass composition, except for the liquidus temperature which is approximately 140° C. lower than that of the known glass composition. Said low $T_{liq}$ enables the glass to be drawn into tubes which are free of crystals. The wide Working Range and the low $T_{soft}$ have a favorable effect on the shaping process, for example the Danner or Vello process.

Surprisingly, the mercury consumption of mercury vapor discharge lamps made from the glass with a composition according to the invention is approximately the same as that for mercury vapor discharge lamp made from the known glass. The use of the glass according to the invention leads to a comparable mercury consumption in the lamp. The use of the glass according to the invention causes an internal protective coating, for example of $Y_2O_3$, to be redundant. An additional advantage of the glass is that it has a relatively wide Working Range, a relatively low $T_{soft}$, and a favorable $T_{liq}$, so that the glass can be drawn into glass tubing without any problems.

FIG. 3 is a diagrammatic perspective view of a stem for an electric lamp made from a glass with a composition in accordance with the invention. Said stem comprises a flare 23, current supply conductors 22 of copper-clad wire, an exhaust tube 27, and an electrode 23. The flare 23 and the exhaust tube 27 consist of a glass having a glass composition according to the invention. When the lamp envelope (not shown in FIG. 3) is provided, the edge or aperture of the lamp envelope and the edge of the flare 23 are sealed together. The lamp envelope is vacuum exhausted via the exhaust tube 27 and, next, inert gas is introduced into the lamp envelope. The exhaust tube is heated and sealed up at the location of reference numeral 28, thereby forming a vacuum-tight pinch.

FIG. 4 shows the lumen maintenance M (in %) as a function of the fluorescent powder weight $w_{fp}$ (the amount of fluorescent powder per surface area present on the inner wall of the discharge vessel) of a low-pressure mercury vapor discharge lamp with a lamp envelope made from a glass with a composition in accordance with the invention (squares in FIG. 4) as compared with a lamp envelope made from the known glass (triangles in FIG. 4). The low-pressure mercury vapor discharge lamps (both PL-C lamps) have been burning for approximately 3000 hours in a so-called 165/15 cycle known in the art. Taking into account error margins of approximately 3%, the maintenance results for the glass composition according to the invention are slightly better than those of the known glass.

It will be evident that many variations within the scope of the invention can be conceived by those skilled in the art.

The scope of the invention is not limited to the embodiments. The invention resides in each new characteristic feature and each combination of novel characteristic features. Any reference signs do not limit the scope of the claims. The word "comprising" does not exclude the presence of other elements or steps than those listed in a claim. Use of the word "a" or "an" preceding an element does not exclude the presence of a plurality of such elements.

The invention claimed is:

1. An electric lamp comprising a glass component, the composition of the glass component being substantially free of PbO and comprising, expressed as a percentage by weight, the following constituents:

55–70 weight % $SiO_2$,
<0.1 weight % $Al_2O_3$,
0.5–4 weight % $Li_2O$,
0.5–3 weight % $Na_2O$, 10–15 weight % K$_2$O,
0–3 weight % MgO,
0–4 weight % CaO,
0.5–5 weight % SrO,
7–10 weight % BaO.

2. The electric lamp as claimed in claim 1, characterized in that the composition of the glass component comprises:
65–70 weight % SiO$_2$,
<0.1 weight % Al$_2$O$_3$,
1.4–2.2 weight % Li$_2$O,
1.5–2.5 weight % Na$_2$O,
11–12.3 weight % K$_2$O,
1.8–2.6 weight % MgO,
2.5–4 weight % CaO,
2–3.5 weight % SrO,
8–9.5 weight % BaO.

3. The electric lamp as claimed in claim 1, characterized in that the composition of the glass component in addition comprises: 0.01–0.2 weight % Fe$_2$O$_3$ or 0.01–0.2 weight % CeO$_2$.

4. The electric lamp as claimed in claim 1, characterized in that the composition of the glass component in addition comprises: 0.01–0.2 weight % SO$_3$.

5. The electric lamp as claimed in claim 1, characterized in that the sum of the concentrations of Li$_2$O, Na$_2$O, and K$_2$O is in the range from 14 to 16 weight %.

6. The electric lamp as claimed in claim 1, characterized in that the sum of the concentrations of SrO and BaO is in the range from 10 to 12.5 weight %.

7. A stem for an electric lamp having a glass portion, the glass portion having a composition as claimed in claim 1.

8. A lamp envelope which is manufactured from a glass having a composition as claimed in claim 1.

9. The lamp envelope as claimed in claim 8, characterized in that the lamp envelope is tubular.

10. A mercury vapor discharge lamp comprising a lamp envelope, the lamp envelope enclosing, in a gastight manner, a discharge space provided with a filling of mercury and a rare gas, the lamp envelope comprising discharge means for maintaining a discharge in the discharge space, characterized in that the lamp envelope is made from a glass having a composition as claimed in claim 1.

11. A glass for use in glass components of electric lamps, the glass having a composition as claimed in claim 1.

12. A electric lamp comprising a glass component, the composition of the glass component being substantially free of PbO and comprising, expressed as a percentage by weight, the following constituents:
55–70 weight % SiO$_2$,
<0.1 weight % Al$_2$O$_3$,
0.5–4 weight % Li$_2$O,
0.5–3 weight % Na$_2$O,
10–15 weight % K$_2$O,
0–3 weight % MgO,
0–4 weight % CaO,
0.5–5 weight % SrO,
7–10 weight % BaO.
0.01–0.2 weight % SO$_3$.

13. The electric lamp as claimed in claim 1, wherein the composition of the glass component comprises 0.5-2.2 weight % Li$_2$O.

14. The electric lamp as claimed in claim 1, wherein the composition of the glass component comprises 0.5-2.5 weight % Na$_2$O.

15. The electric lamp as claimed in claim 1, wherein the composition of the glass component comprises 2.5-4 weight % CaO.

16. The electric lamp as claimed in claim 1, wherein the composition of the glass component comprises CeO$_2$.

17. The electric lamp as claimed in claim 16, wherein the composition of the glass component comprises 0.1-0.2 weight % CeO$_2$.

* * * * *